United States Patent [19]

Müller et al.

[11] 4,333,439
[45] Jun. 8, 1982

[54] APPARATUS FOR CONTROLLING THE EXHAUST GAS RECIRCULATION RATE IN AN INTERNAL COMBUSTION ENGINE

[75] Inventors: Klaus Müller, Tamm; Helmut Maurer, Schwieberdingen; Franz Rieger, Aalen; Ernst Linder, Mühlacker, all of Fed. Rep. of Germany

[73] Assignee: Robert Bosch GmbH, Stuttgart, Fed. Rep. of Germany

[21] Appl. No.: 127,158

[22] Filed: Mar. 4, 1980

[30] Foreign Application Priority Data

Mar. 22, 1979 [DE] Fed. Rep. of Germany ....... 2911209

[51] Int. Cl.³ ............................................. F02M 25/06
[52] U.S. Cl. .................................................. 123/569
[58] Field of Search ......................... 123/569, 568, 571

[56] References Cited

U.S. PATENT DOCUMENTS

| | | | |
|---|---|---|---|
| 3,851,632 | 12/1974 | Teshirogi et al. | 123/569 |
| 4,161,933 | 7/1979 | Stumpp | 123/568 X |
| 4,168,683 | 9/1979 | Hata et al. | 123/571 |
| 4,195,604 | 4/1980 | Taplin | 123/571 |
| 4,222,356 | 9/1980 | Veda et al. | 123/568 |

FOREIGN PATENT DOCUMENTS

| | | | |
|---|---|---|---|
| 2635325 | 3/1977 | Fed. Rep. of Germany | 123/571 |
| 2750537 | 5/1979 | Fed. Rep. of Germany | 123/569 |
| 2803750 | 8/1979 | Fed. Rep. of Germany | 123/571 |
| 2042770 | 9/1980 | United Kingdom | 123/571 |

*Primary Examiner*—Wendell E. Burns
*Attorney, Agent, or Firm*—Edwin E. Greigg

[57] ABSTRACT

An apparatus is proposed for controlling the exhaust recirculation rate in an internal combustion engine, in particular an engine with auto-ignition, which includes preferably one mixture valve in the area of the discharge opening of the exhaust recirculation line and which is characterized in that the control is accomplished via the mixture valve position ahead of the inlet valves in accordance with the concentration of at least one component of the air-exhaust gas mixture and/or at least one component of the exhaust gas. Thus it is possible to operate the engine with a relatively emission-free exhaust. An exhaust gas reservoir is further provided, with which peaks in the exhaust gas concentration due to a dynamic driving mode can be intercepted. Finally, it is also proposed that the exhaust recirculation be realized solely via a pressure, which can be controlled in open-loop or closed-loop fashion, in the exhaust line by means of a valve.

9 Claims, 5 Drawing Figures

APPARATUS FOR CONTROLLING THE EXHAUST GAS RECIRCULATION RATE IN AN INTERNAL COMBUSTION ENGINE

BACKGROUND OF THE INVENTION

The invention relates to an apparatus for controlling the exhaust gas recirculation rate of an engine with auto-ignition, a throttle device in the exhaust manifold having means of controlling exhaust recirculation in accordance with exhaust gas pressure and operating characteristics. An apparatus of this kind is known in which a predetermined fresh-air component quantity is metered in accordance with the fuel consumption and with the rpm, with the aid of a baffle-type mixture valve for exhaust gas and fresh air. The fundamental concept is the following: The exhaust gas composition in an internal combustion engine has been determined to be dependent on the temperature of combustion, among other factors. As the combustion temperature rises, the toxic exhaust gas component quantity increases, yet the intention is to reduce this quantity. Accordingly, the temperature of combustion must be lowered, and this can be done by reducing the oxygen component quantity of the total cylinder charge. In the known apparatus, the appropriate fresh-air quantity is accordingly metered for a particular fuel quantity (which in turn is associated with the driver's intentions), and the remaining gas charge for the cylinders is furnished from the exhaust gas. This also has the further effect of reducing the toxic gases as a result of the "afterburning" of the recirculated exhaust gas.

Although the known apparatus generally gives acceptable results, still it does not represent an optimal solution to the problems it is intended to solve, because in particular the fresh-air metering is controlled in an open-loop fashion only; or, if a mechanical air flow rate meter is used, the apparatus is not particularly favorable in terms of cost.

OBJECTS AND SUMMARY OF THE INVENTION

The apparatus according to the invention and having an engine with auto-ignition, a throttle device in the exhaust manifold having means of controlling exhaust recirculation in accordance with exhaust gas pressure and operating characteristics and has the advantage over the prior art in that the effect of the exhaust gas recirculation on the escaping exhaust gas and/or on the aspirated gas mixture consisting of fresh air and exhaust gas is detected by measurement, for instance of some exhaust gas component (such as oxygen); the proportion of exhaust gas is then corrected in such a manner that the emission of toxic gases and/or fuel consumption becomes minimal.

The fundamental object of the invention is that the measurable exhaust gas component quantity, in every operational state having exhaust gas recirculation, can assume values at which the exhaust gas has an optimum composition in terms of all toxic substances.

It has proved to be advantageous for concentration sensors to be used for at least one component as well as for the exhaust gas and the aspirated air. Beyond this, in detecting the exhaust gas components a throttle device can also be provided in the exhaust manifold, in order to obtain a certain exhaust gas recirculation rate via an appropriate directional control of exhaust gas flow. Further advantages result in combination with the subjects of the dependent claims, as shown in the drawings and as described below.

The invention will be better understood and further objects and advantages thereof will become more apparent from the ensuing detailed description of preferred embodiments taken in conjunction with the drawings.

DESCRIPTION OF THE PREFERRED EMBODIMENTS

In highly schematic fashion, the drawings show internal combustion engines having intake manifolds and exhaust manifolds as well as the apparatuses according to the invention intended for setting the exhaust gas recirculation rate.

Figure 1:
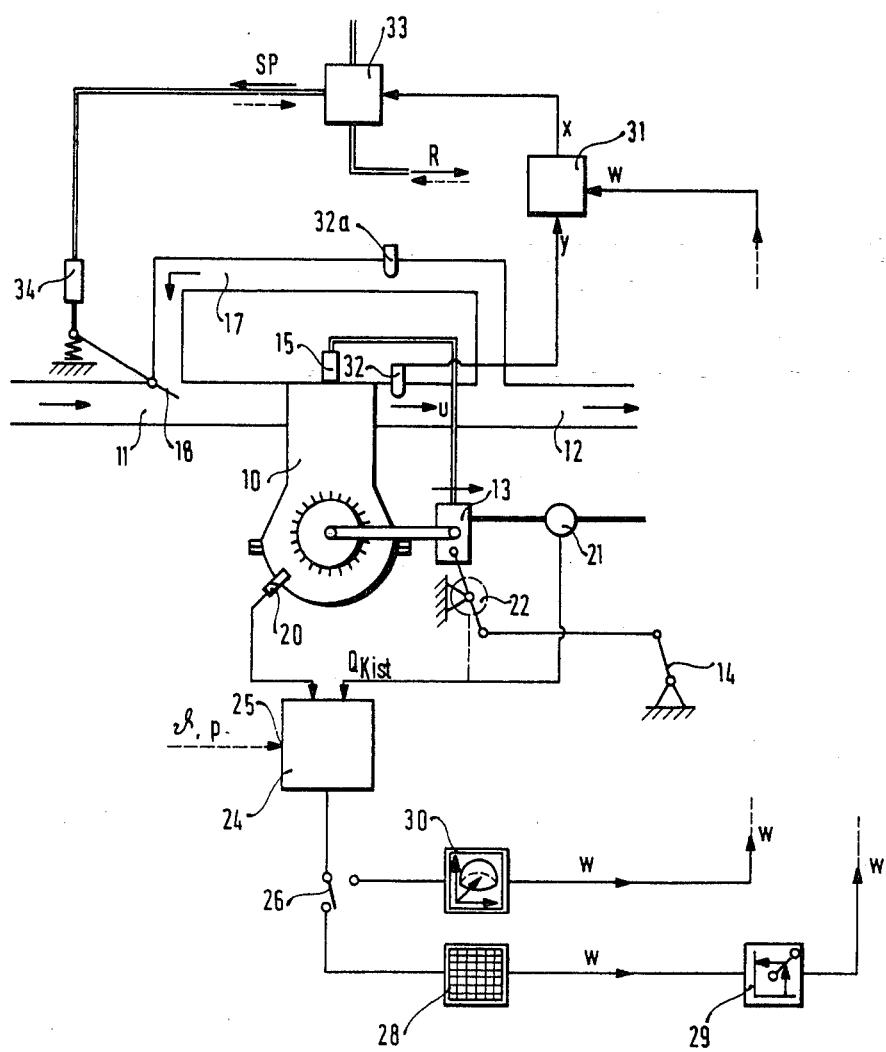
FIG. 1 is a block circuit diagram of the apparatus for controlling the exhaust gas composition via exhaust recirculation in an internal combustion engine having a sensor in the exhaust manifold.

FIG. 1 shows an internal combustion engine 10, an air intake manifold 11 and an exhaust manifold 12. The throughput of a fuel pump 13 is determined by an accelerator pedal 14, among others, and the fuel quantity metered by the pump 13 is injected thereby via a fuel injection valve 15, in an engine having auto-ignition, directly into the cylinders of the engine 10. An exhaust recirculation line 17 has a mixture valve 18 located at its point of discharge into the air intake manifold 11. In the two extreme positions of this mixture valve 18, it closes either the exhaust recirculation line 17 or—at least nearly completely—the air intake manifold 11. The drawing further shows an rpm meter 20, a fuel quantity meter 21, and a meter 22 for the position of the accelerator pedal. The output signals of the rpm transducer 20 and the fuel quantity meter 21 or the meter 22 for accelerator pedal position are carried to a data detection apparatus 24, which can be supplied via a further input 25 with still other variables such as a temperature signal and/or a pressure signal. On the output side, the data detection apparatus 24 is connected with an alternating switch 26. This alternating switch illustrates clearly two alternatives for the further processing of signals. In the first alternative, which is shown in the figure, the output signal of the data detection apparatus 24 reaches a memory matrix 28 and subsequently, if needed, an interpolator 29. The second alternative relates to the ascertainment of a control signal via a characteristic curve element 30. The output signals from the memory matrix 28, interpolator 29 and characteristic curve element 30 are marked by the letter w, and they represent given setpoint values supplied to a closed-loop control apparatus 31 for controlling, for instance, the oxygen concentration in the exhaust gas. The measurement value y relating to the oxygen concentration in the exhaust gas of the engine 10, which is ascertained by means of an oxygen sensor 32, is supplied to this control apparatus 31. The oxygen sensor 32 furnishes a preferably analog signal at a level which corresponds to the oxygen concentration at a particular time in the exhaust gas. To this extent, the sensor 32 is a measuring device for oxygen concentration.

The output variable x of the control apparatus 31 is supplied to an electrohydraulic or electropneumatic converter 33, which in turn affects the position of the mixture valve 18 via an adjusting member 34.

The mode of operation of the subject of FIG. 1 is such that an input variable for the memory matrix 28 or the characteristic curve element 30 is formed in the data detection apparatus 24 on the basis of a quantity signal and an rpm signal, as well as of further parameters as needed. In the memory matrix 28 or the characteristic curve element 30, stored values can be called up which have been empirically determined and which furnish a fixed relationship between operational characteristics and the oxygen concentration in the exhaust. The oxygen concentration values in the exhaust are in general related in a fixed fashion to particular concentrations of toxic substances and are selected here in such a manner that the toxic substances at every operational point, or over all operational points, added up in weighted form, result in a minimum value. This optimizing process can be made to include the fuel consumption as well. The attainable degree of precision in determining the oxygen concentration in the exhaust is a matter of the memory capacity of the particular memory matrix 28 or characteristic curve element 30. The ascertained set-point value w is further carried to the control apparatus 31 and this control apparatus generates a setting signal which depends upon the deviation in its input signal between the set points and the actual values.

The data detection apparatus 24 can be realized, for instance, by means of variously dimensioned AND elements, and depending on the embodiment, the data detection apparatus 24 and the memory matrix 28 or the characteristic curve element 30 can also be designed as multi-dimensional memories.

On the basis of direct or indirect signals for the accelerator pedal position and for rpm, a given oxygen concentration value is thus obtained whose agreement with the output signal of the sensor 32 can be directed in closed-loop fashion. A variation of the subject of FIG. 1 can be made by housing the measuring transducer 32a for one component of the exhaust gas in the exhaust recirculation line 17. This arrangement is advantageous with respect to reduced soiling of the measuring sensor; however, it means that there must be a certain flow through the exhaust recirculation line 17, so that the mixture valve 18 cannot be permitted to close off the line 17 completely.

Figure 2:
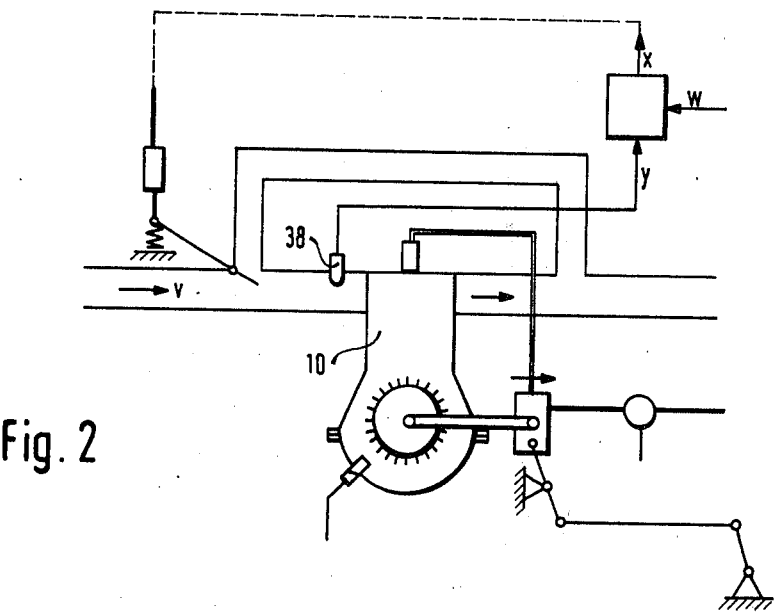
FIG. 2 is a corresponding apparatus having a sensor in the intake manifold.

FIG. 2, in principle, shows the same subject as FIG. 1, with the difference being that the measuring sensor is located ahead of the inlet valves of the engine 10 and thus measures the aspirated mixture of air and exhaust gas to determine its oxygen content. The sensor is given reference numeral 38 for purposes of distinguishing it more easily from that shown in FIG. 1. The disposition of the sensor 38 ahead of the inlet valves is particularly advantageous when it is important to effect rapid closed-loop control of the oxygen concentration in the aspirated gas mixture, because in this arrangement the dead time otherwise caused by the engine 10 is avoided.

In any case, the sensor 38, because of its position, must be heated to a greater extent, and the oxygen concentration in the exhaust gas is not measured. The manner in which the measuring sensor will be installed in a particular engine type, for a particular intended use, depends upon many factors.

Figure 3:
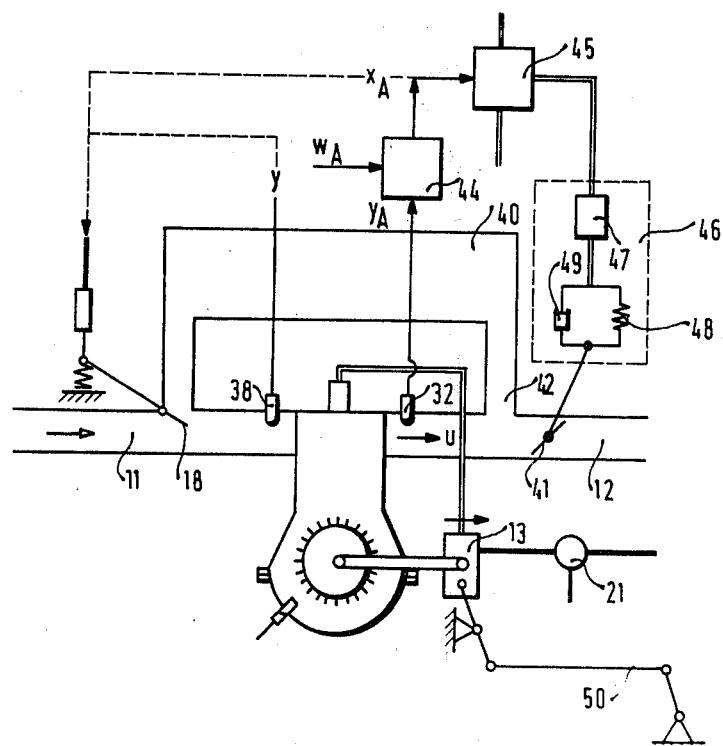
FIG. 3 shows the subject of the invention with a measurement sensor disposed in both the exhaust manifold and the air intake manifold, and having a supplementary exhaust gas reservoir.

The embodiment of FIG. 3 includes, in addition to the subjects already shown in FIGS. 1 and 2, an exhaust gas reservoir 40. Also, a measuring sensor 32 is provided in the exhaust manifold 12 and there is also a sensor 38 in the air intake manifold 11. A valve 41 in the exhaust manifold 12 serves to fill and empty the exhaust gas reservoir 40, being disposed beyond the exit opening of the exhaust recirculation line 42. In the subject of FIG. 3, the mixture valve 18 is set by the output signal of the measuring sensor 38 in the air intake manifold 11, among other factors. The measuring sensor 32 in the exhaust manifold 12, in contrast, sets a converter 45 for an adjusting member 46 via a control device 44; the adjusting member 46, in turn, sets the valve 41 and thus directs the flow of exhaust gas to a greater or lesser extent into the reservoir 40 or into the exhaust manifold 12. It is the purpose of this control loop to divert exhaust gas having peaks of concentration—caused by a dynamic mode of driving—into the exhaust gas reservoir 40, where it is mixed with exhaust gas there present from previous driving states and then supplied via the exhaust recirculation line back to the engine for combustion.

In order to avoid excess throttling of the exhaust gas flow through the valve 41 when exhaust throughputs are high, a spring 48 with a parallel damper 49 is located between a positioner 47 in the adjusting member 46 and the valve 41. The valve 41 is then opened by means of the exhaust gas counterpressure. The closed-loop control of the position of the valve 41 as sketched can naturally be replaced by an open-loop control means. In that case, then only dynamic adjustments—picked up at the pump 13, for example, or the fuel quantity meter 21 or the accelerator pedal rod 50—are evaluated, for example, by being weighted by means of a differentiating or evaluation element 47. These parameters are briefly switched onto the adjusting member 46, which in combination with the spring 48 and the damper 49 results in proportionally yielding behavior upon element 47 on the part of the valve 41.

In the embodiment of FIG. 3 it is important that the gas composition in the air intake manifold ahead of the injection valves be controlled in accordance with the concentration of the oxygen, for example, and/or in accordance with the exhaust composition in the exhaust manifold. Peaks of soot emission can be greatly reduced when the reservoir 40 includes, for instance, a solid-substance precipitator and thus the major portion of the soot particles can be precipitated out.

Figure 4:
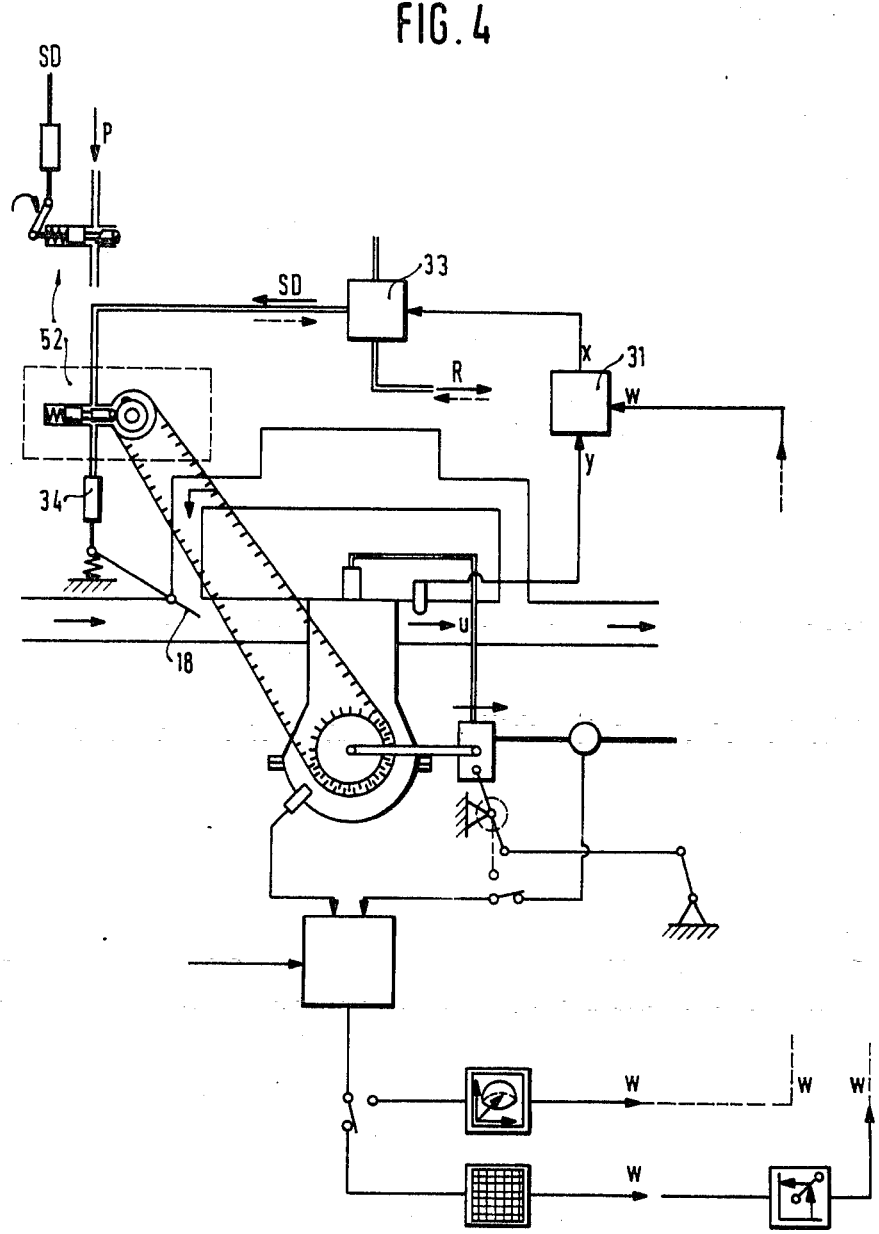
FIG. 4 shows a corresponding apparatus for controlling the exhaust gas and fresh air in stratified fashion; and, finally.

FIG. 4 shows a variation of the embodiment of FIG. 1 wherein the mixture valve 18 is adjusted in pulsed fashion and there is thus a stratification of the gas charge in the cylinders with layers of fresh air and exhaust gas. In this case, the control apparatus 31, in combination with the final control element 33, determines the pressure of the control medium for the adjusting member 34 and thus determines the position of the mixture device 18, and this pressure, because of an rpm-dependent interruption control means 52, becomes effective only in pulses. Shown above this element 52 is a modified type of interrupter 52. It is distinguished by a control of the pulse durations for the supply to the adjusting member 34 by means of a variable control edge, while in the interrupter 52 depicted in FIG. 4 itself, no pulse length modulation takes place in the exertion of pressure. Naturally the pulse length modulation can also be realized purely electrically, with known means, on the basis of operating characteristics.

Figure 5:
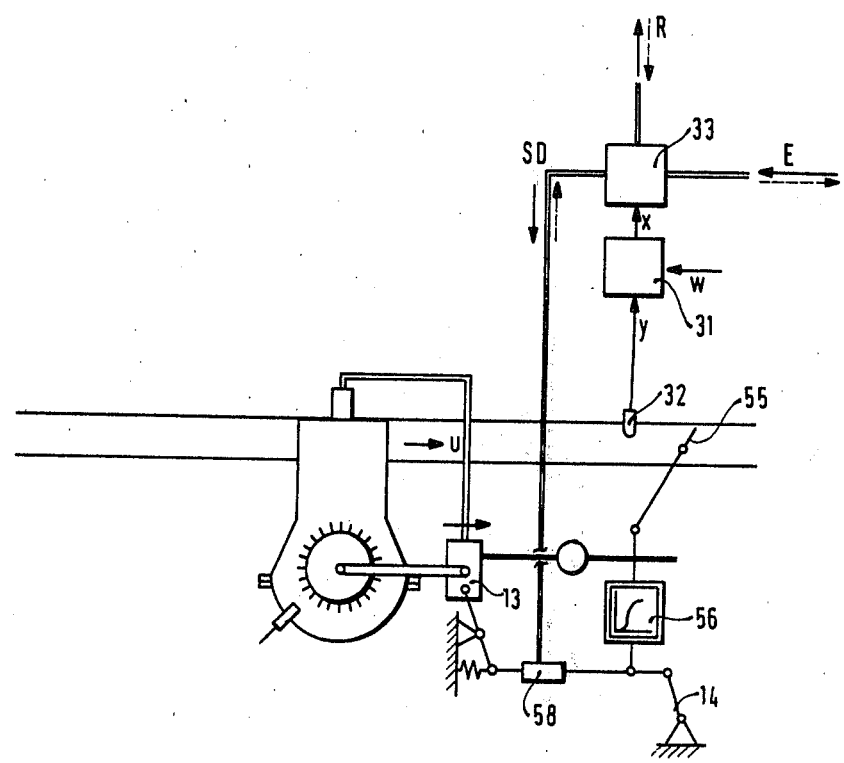
FIG. 5 shows an exemplary embodiment for an apparatus intended for affecting the exhaust recirculation rate via a throttle valve in the exhaust manifold.

In the embodiment of FIG. 5, the exhaust recirculation takes place solely through the generation of an exhaust gas counterpressure, with a valve 55 being disposed in the exhaust manifold the position of which is determined on the basis of the position of the accelerator pedal 14 via a characteristic curve follower generator 56. In principle, the valve 55 opens when the driver presses down on the accelerator pedal and closes when pressure is withdrawn from the accelerator pedal. The sensor 32, which measures an exhaust gas component, is given the task of influencing a relative positioner 58 via the control apparatus 31 and the electrohydraulic final control element 33, as described above. The relative positioner 58 is located between the accelerator pedal 14 and the pump 13 or corresponding adjusting members therefor and varies the quantity of fuel to be injected. In this manner it is possible to undertake a control of fuel quantity dependent on exhaust gas in order to have controlled exhaust recirculation. The set point value w can then be a fixed or a sliding value, and may be prepared, for instance, in the manner shown in connection with FIG. 1.

In FIG. 5, among other factors, it is important that the exhaust recirculation not take place via an exhaust recirculation line, but rather on the basis of the exhaust gas pressure, which is adjustable by means of the valve 55.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A system for controlling exhaust gas recirculation rate in an internal combustion engine having an auto-ignition comprising:
    an air intake manifold;
    an exhaust manifold;
    an exhaust recirculation line extending from said exhaust manifold to a junction with said air intake manifold;
    a mixture valve in an area of the junction of said exhaust circulation line with said air intake manifold;
    control means for controlling positions of said mixture valve relative to said junction and said air intake manifold;
    a data detection apparatus for detecting different operational variables of said engine and producing an output signal in accordance with said operational variables;
    set-point value means for receiving said output signal from said data detection apparatus, said means producing an output signal representing given set-point values;
    at least one oxygen sensor for producing an output signal corresponding to oxygen concentrations;
    a closed-loop control apparatus for receiving said set-point values from said means for receiving output signals from said data detection apparatus and from said at least one oxygen sensor, said closed-loop control apparatus having an output related to said set-point values and oxygen concentration;
    a converter means for receiving said output signal from said closed-loop control apparatus and directing an output signal to said mixture valve control means for positioning said mixture valve relative to said junction and said air inlet manifold.

2. An apparatus as defined by claim 1, wherein said controlling means is operated in accordance with the oxygen concentration.

3. An apparatus as defined by claim 1, wherein the set-point value of the set-point value means is generated in particular via a characteristic graph curve generator.

4. An apparatus as defined by claim 1, wherein an exhaust collector is associated with the exhaust manifold, the filling of which collector is controllable in accordance with operating characteristics.

5. An apparatus as defined by claim 4, wherein the filling of the exhaust reservoir is controllable in accordance with the exhaust gas composition.

6. An apparatus as defined by claim 5, wherein said data detection apparatus evaluates operating characteristics such as rpm, pressure and temperature.

7. An apparatus as defined by claim 1, wherein said controlling means is responsive to the intermittent operation of the mixture valve.

8. An apparatus as defined by claim 1, wherein a sensor is located in the exhaust recirculation line.

9. A system for controlling exhaust gas recirculation rate in an internal combustion engine as claimed in claim 1 which comprises a throttle device in the exhaust manifold having means for controlling exhaust recirculation through said exhaust recirculation line in accordance with exhaust gas pressure and engine operating characteristics.

* * * * *